United States Patent [19]

Agarwal et al.

[11] Patent Number: 5,513,366
[45] Date of Patent: Apr. 30, 1996

[54] METHOD AND SYSTEM FOR DYNAMICALLY RECONFIGURING A REGISTER FILE IN A VECTOR PROCESSOR

[75] Inventors: Ramesh C. Agarwal, Yorktown Heights, N.Y.; Randall D. Groves, Austin, Tex.; Fred G. Gustavson, Briarcliff Manor, N.Y.; Mark A. Johnson, Austin, Tex.; Brett Olsson, Round Rock, Tex.

[73] Assignee: International Business Machines Corporation, Armonk, N.Y.

[21] Appl. No.: 313,971

[22] Filed: Sep. 28, 1994

[51] Int. Cl.⁶ .................................................. G06F 17/16
[52] U.S. Cl. ................. 395/800; 364/231.9; 364/247.4; 364/931.51; 364/931.03; 364/DIG. 1
[58] Field of Search ...................................... 395/800, 411

[56] References Cited

U.S. PATENT DOCUMENTS

| | | | |
|---|---|---|---|
| 4,771,380 | 9/1988 | Kris | 395/800 |
| 5,073,970 | 12/1991 | Aoyama | 395/800 |
| 5,170,370 | 12/1992 | Lee | 364/736 |
| 5,226,135 | 7/1993 | Mishina | 395/425 |
| 5,463,577 | 10/1995 | Oowaki | 365/63 |

*Primary Examiner*—Eric Coleman
*Attorney, Agent, or Firm*—Mark E. McBurney; L. Bruce Terry; Andrew J. Dillon

[57] ABSTRACT

A controller is coupled to a plurality of registers arranged in an array having a physical configuration of N rows of registers and M columns of registers. A size register within the controller is provided for receiving a selected vector size parameter, which specifies a number of registers comprising a vector register. In response to the vector size parameter, columns in the register array are selected and concatenated to form a vector register having at least a number of registers equal to the vector size parameter. An offset parameter may be utilized to select columns that form a vector register from the M number of columns in the array. Multiple arithmetic logic units, where one arithmetic logic unit is coupled to each row of registers are utilized to perform vector operations. Any register in the array may be utilized to store a vector element or a scalar expression. Vector register lengths, and the number of vector registers, may be dynamically configured by setting the vector size parameter and the offset parameter in the controller.

7 Claims, 8 Drawing Sheets ically, the speed and
computational power of the data processing system has continuously increased as designers make advances in semiconductor design and manufacturing techniques, and as the architectural design of the central processing unit (CPU) is improved. One such improvement in CPU architecture is the addition of pipelining.

METHOD AND SYSTEM FOR DYNAMICALLY RECONFIGURING A REGISTER FILE IN A VECTOR PROCESSOR

CROSS-REFERENCE TO RELATED APPLICATION

The present application is related to U.S. patent application Ser. No. 08/313,970, entitled "Method and System for Performing SIMD-Parallel Operations in a Superscalar Data Processing System" filed of even date herewith by the inventors hereof, assigned to the assignee herein, and incorporated herein by reference for all purposes.

BACKGROUND OF THE INVENTION

1. Technical Field

The present invention relates in general to an improved data processing system, and in particular to an improved vector processor. Still more particularly, the present invention relates to an improved vector processor having a dynamically reconfigurable register file.

2. Description of the Related Art

In the art of data processing system design, the speed and computational power of the data processing system has continuously increased as designers make advances in semiconductor design and manufacturing techniques, and as the architectural design of the central processing unit (CPU) is improved. One such improvement in CPU architecture is the addition of pipelining.

Pipelining increases the speed of processing a sequence of instructions by starting the execution of all instructions before the execution of all previous instructions is completed. For example, the CPU may begin fetching an instruction from memory while another part of the CPU is decoding a previously fetched instruction. Thus, pipelining does not speed up the execution of any one instruction, but it may speed up the processing of a sequence of instructions because succeeding instructions are being processed in the CPU before the processing of prior instructions has been completed.

Another architectural improvement in CPU design is the utilization of special processor functional blocks that are optimized for rapidly performing a limited set of instructions. For example, some CPUs include functional blocks for performing only fixed-point arithmetic, or only floating-point arithmetic, or for processing only branch instructions. These functional blocks, which may be referred to as execution units, may perform their assigned limited functions much faster than a single general purpose processor is able to perform the same function.

When the vertical parallelism achieved by pipelining is combined with the horizontal parallelism achieved by utilizing multiple execution units the computational power of the CPU is further increased. Such a combination of vertical and horizontal parallelism permits the hardware to take a sequential instruction stream and dispatch (or issue) several instructions per clock cycle into the pipelines associated with the execution units. A CPU that utilizes multiple pipelined execution units may be called a superscalar processor.

FIG. 1 is a high-level block diagram of such a superscalar data processing system. As illustrated, superscalar data processing system 100 includes branch execution unit 102, which is coupled to memory 104 via instruction bus 106 and address bus 108. Branch execution unit 102 may fetch multiple instructions from memory 104 during a single clock cycle and dispatch such instructions to an appropriate execution unit via instruction dispatch buses 110.

Another execution unit within superscalar data processing system 100 is load/store execution unit 112. Load/store execution unit 112, which may be implemented within a fixed-point execution unit, performs address calculations and generates memory requests for instructions requiring memory access. Load/store execution unit 112 provides address information to memory 104 via address bus 114.

Floating-point execution unit 116 may also be included within superscalar data processing system 100. Floating-point execution unit 116 is optimized to receive, buffer, and execute floating-point calculations. Floating-point execution unit 116 may be coupled to memory 104 via data bus 118.

Fixed-point execution unit 120 is yet another execution unit which may be included within superscalar data processing system 100. Fixed-point execution unit 120, which may be coupled to memory 104 via data bus 122, may be utilized to perform integer calculations. In some implementations, fixed-point execution unit 120 may include the load/store functions performed by load/store execution unit 112. One example of such a superscalar data processing system having multiple pipelined execution units is the processor manufactured under the trademark "IBM RISC System/6000 Model 59H" by International Business Machines Corporation (IBM) of Armonk, N.Y.

In many prior art CPUs, a single instruction stream directs the CPU to perform operations on a single data stream. That is, each CPU instruction performs an operation on defined data to produce one calculation per instruction. Such CPUs may be referred to as "single-instruction single-data" (SISD) processors. One problem with SISD processors may be seen during the execution of software which performs the same instruction utilizing multiple data operands. If the application program requires the same CPU instruction to be performed using multiple data operands, the CPU may be programmed to loop through a short software segment many times. That is, the CPU may be programmed to perform a "DO loop" to perform a particular operation on multiple data operands. During such a DO loop, the instruction performed on multiple operands must be recalled from memory in each pass through the DO loop. This process of repeatedly recalling a single instruction may reduce the available instruction bandwidth of the CPU. Such a reduction in available instruction bandwidth means that the CPU may not be able to fetch instructions for other execution units to keep all the pipelines filled.

Another improvement in CPU architecture permits the CPU to utilize a single instruction to operate on multiple data streams or multiple operands. Such a CPU architecture is utilized in a "single-instruction multiple-data" (SIMD) processor. In an SIMD processor, high-level operations, invoked by a single instruction, are performed on vectors, which are linear arrays of numbers. A typical vector operation might add two 64-entry, floating-point vectors to obtain a single 64-entry vector. This vector instruction may be equivalent to an entire DO loop, in which each iteration of the DO loop includes a computation of one of the 64 elements of the result, an update of the indices, and a branch back to the beginning of the DO loop. For an instructional discussion of vector processing see chapter 7 of *Computer Architecture, A Quantitive Approach* by John L. Hennessy and David A. Patterson, published by Morgan Kaufmann Publishers, Inc., Palo Alto, Calif., pages 351–379.

Another advantage of using an SIMD-parallel processor is that the computation of each result, or element in a vector, is independent of the computation of a previous result. This allows a very deep pipeline without generating data hazards. Data hazards occur when the execution of an operation depends upon the result of a previously scheduled operation.

Another advantage of using an SIMD-parallel processor is that vector instructions that access memory have a known memory access pattern. For example, if the vector's elements are all stored in adjacent memory locations, then fetching the vector from a set of heavily interleaved memory banks works well. When recalling a vector from main memory, the high latency of initiating a main memory access (compared with the latency of accessing a cache memory) may be amortized over the access for an entire vector rather than a single element. Thus, the cost of the main memory latency may be incurred once for the entire vector, rather than for each word of the vector.

Yet another advantage of using an SIMD-parallel processor is that such a single vector instruction may specify a large amount of computational work. Such a single vector instruction may be equivalent to executing an entire DO loop. Thus, the instruction bandwidth requirement of the CPU is reduced, and the "Flynn bottleneck," which is a limitation that prevents fetching and issuing of more than a few instructions per clock cycle, is considerably mitigated.

Because of the advantages described above, vector operations may be executed faster than a sequence of scalar operations on the same number of data elements. However, many vector processors in the prior art use a fixed register configuration, which may not be the optimum register configuration for a particular vector calculation performed by an application. The register configuration of such known vector processors may be fixed in three areas of design: first, the number of available vector registers, which may not be optimal across a broad range of applications; second, the vector register length (i.e., the number of elements that may be stored in a vector register) may not be large enough for the vector calculations required by an application program; and finally, the number of vector registers versus the number of scalar registers may not be optimal for the vector and scalar calculations required by a particular application program.

Many known vector processors include a number of vector registers having a fixed length, which may range from 64 elements to 256 elements. If an application program manipulates vectors having a vector length greater than the length of the vector register, the application program performs two or more smaller vector operations in order to complete a vector operation on such a large vector. Conversely, if a vector processor provides relatively large vector registers, many application programs will not utilize the entire vector capacity during vector calculations involving smaller vectors, thus allowing valuable register storage space to go unused. Because different applications, or portions of the same application, may require the processing of vectors having different vector lengths, it is difficult to select a vector register length that will satisfy the needs of all vector processing application programs. Moreover, many prior art vector processors will not permit unused registers in a long vector register to be utilized to store an additional vector or scalar operand.

The selection of a fixed number of vector registers and a fixed number of scalar registers causes a similar problem. This problem occurs because some calculations involving vectors may involve no scalar operands, while other calculations involving vectors may require several scalar operands. The differing requirements make the selection of a fixed number of vector registers and a fixed number of scalar registers impossible to optimize for the various requirements that different application programs may impose.

Thus, the problem remaining in the prior art is to provide a method and system for efficiently and dynamically reconfiguring a register file in a vector processor such that optimal vector register length may be selected, the optimal partition between scalar registers and vector registers may be selected, and vectors having different lengths may be simultaneously stored in the register file of the vector processor.

SUMMARY OF THE INVENTION

It is therefore one object of the present invention to provide an improved data processing system.

It is another object of the present invention to provide an improved vector processor via SIMD parallelism.

It is yet another object of the present invention to provide an improved vector processor having a dynamically reconfigurable register file.

Yet another object of the present invention is to provide an improved vector processor having a dynamically reconfigurable register file that provides interchangeable vector registers and scalar registers.

Still another object of the present invention is to provide an improved vector processor having a dynamically reconfigurable register file which vector registers having different vector register lengths to co-exist in the register file.

The foregoing objects are achieved as is now described. A controller is coupled to a plurality of registers arranged in an array having a physical configuration of N rows of registers and M columns of registers. A size register within the controller is provided for receiving a selected vector size parameter, which specifies a number of registers comprising a vector register. In response to the vector size parameter, columns in the register array are selected and concatenated to form a vector register having at least a number of registers equal to the vector size parameter. An offset parameter may be used to select columns that form a vector register from the M number of columns in the array. Multiple arithmetic logic units, where one arithmetic logic unit is coupled to each row of registers, perform vector operations. Any register in the array may be used to store a vector element or a scalar expression. Vector register lengths, and the number of vector registers, may be dynamically configured by setting the vector size parameter and the offset parameter in the controller.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
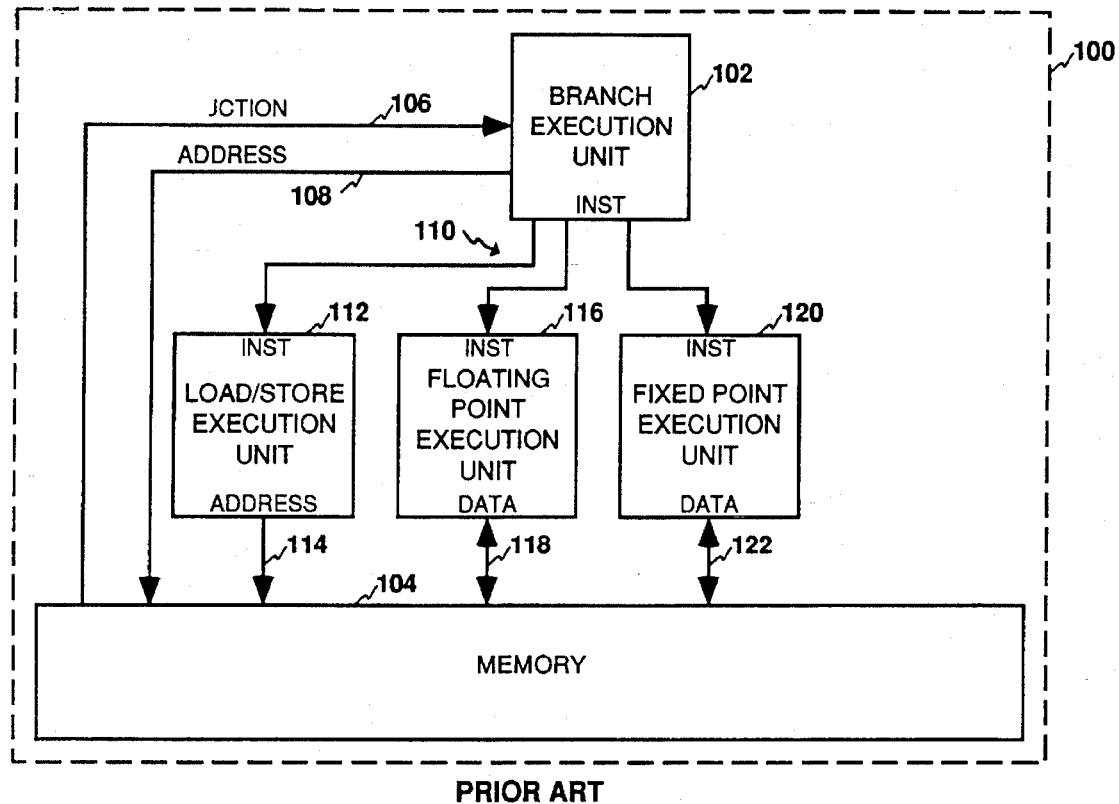
FIG. 1 is a high-level block diagram of a superscalar processor which is known in the prior art.
Figure 2:
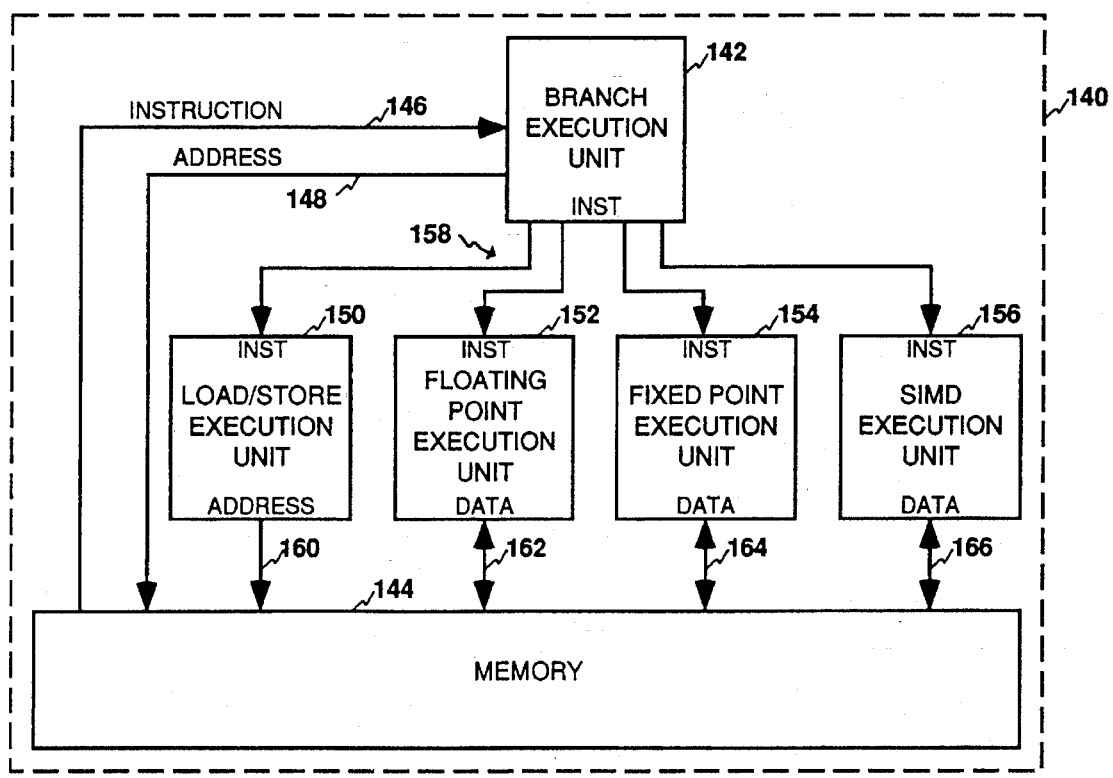
FIG. 2 depicts a high-level block diagram of a superscalar data processing system having an SIMD execution unit in accordance with the method and system of the present invention.

With reference now to the figures and in particular with reference to FIG. 2, there is depicted a high-level block diagram of a superscalar data processing system having an SIMD execution unit in accordance with the method and system of the present invention. As illustrated superscalar data processing system 140 includes branch execution unit 142 which is coupled to memory 144 via instruction bus 146 and address bus 148. Branch execution unit 142 fetches instructions from memory 144 and dispatches such instructions to execution units 150–156, via instruction dispatch buses 158. Memory 144 may be implemented in different levels having different speeds and capacities. Such levels of memory may be structured such that from the viewpoint of any particular level in the hierarchy, the next lower level from the processor is considered to be a cache. A cache memory is an auxiliary memory that provides a buffering capability by which the relatively slow and increasingly large main memory can interface to branch execution unit 142 (or a next higher level of memory) at a cycle time much closer to that of branch execution unit 142.

In the example illustrated in FIG. 2, execution unit 156 is an SIMD execution unit. Thus, within superscalar data processing system 140, branch execution unit 142 interfaces with SIMD execution unit 156 as another "execution class" among the classes of execution units in the superscalar data processing system.

Other execution units within superscalar data processing system 140 include load/store execution unit 150, floating-point execution unit 152, and fixed-point execution unit 154. Load/store execution unit 150, which is coupled to memory 144 via bus 160, is utilized to calculate addresses and provide such addresses to memory 144 during the execution of instructions that require memory access. Load/store execution unit 150 may be utilized to provide an address to memory 144 during the execution of instructions in other execution units. Floating-point execution unit 152, which is coupled to memory 144 via bus 162, is utilized to perform floating-point arithmetic operations. Fixed-point execution unit 154 is coupled to memory 144 via bus 164. SIMD execution unit 156 is coupled to memory 144 via bus 166.

Figure 3:
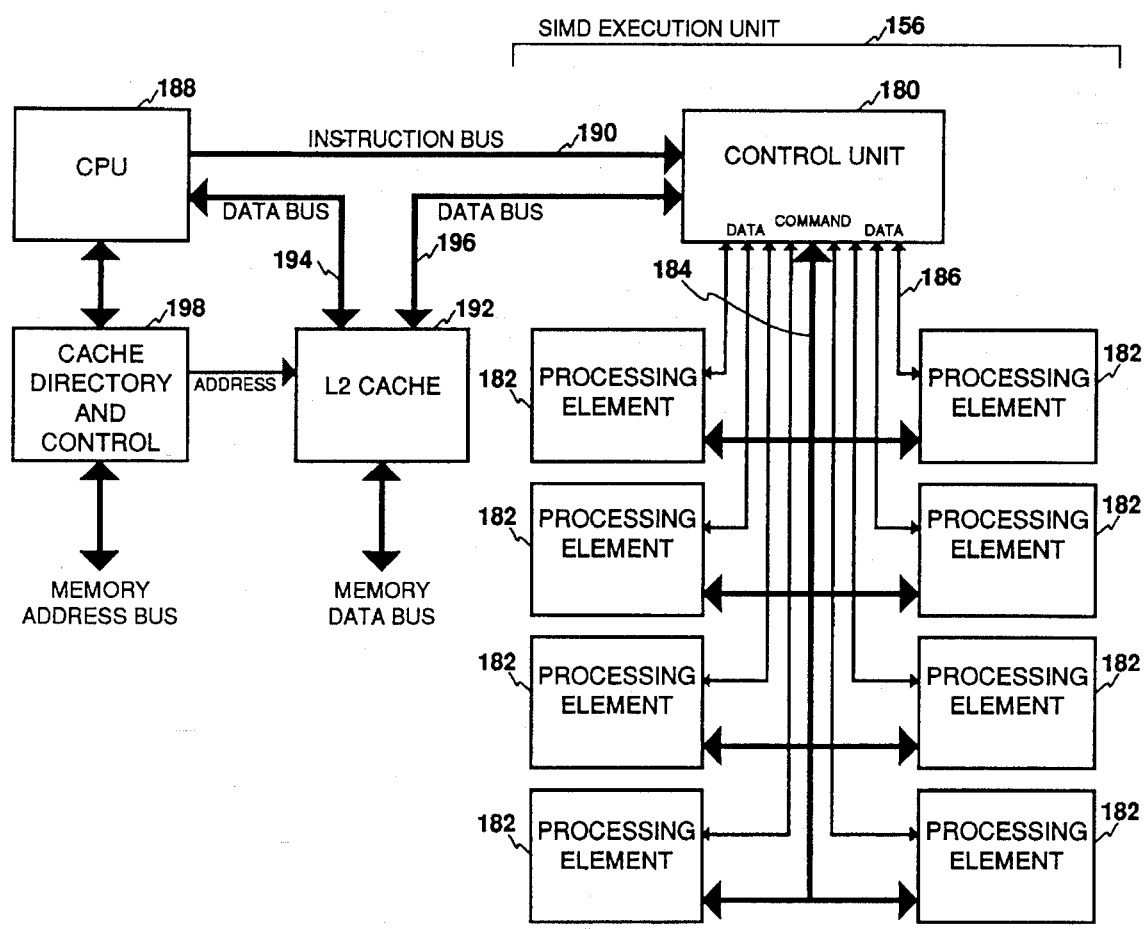
FIG. 3 is a high-level block diagram which further illustrates the components within the SIMD execution unit, and the interface between the SIMD execution unit and the superscalar data processing system in accordance with the method and system of the present invention.

With reference now to FIG. 3, there is depicted a high-level block diagram which further illustrates the components within the SIMD execution unit, and the interface between the SIMD execution unit and the superscalar data processing system in accordance with the method and system of the present invention. As illustrated, SIMD execution unit 156 includes control unit 180 and a plurality of processing elements 182. Control unit 180 dispatches commands to selected processing elements 182 via command bus 184. Control unit 180 transfers data to, and receives data from, processing elements 182 via data buses 186. Each processing element 182 is coupled to control unit 180 with a separate data bus 186.

Control unit 180 receives vector processing instructions from CPU 188 via instruction bus 190. An example of an implementation of CPU 188 is found in the system sold under the trademark "IBM RISC System/6000 Model 59H" by IBM Corporation in Armonk, N.Y. with the following modifications:

provide external access to the instruction bus from the branch execution unit, including control information;

provide an additional register to specify the vector size for vector load and store instructions;

provide external access to the low-order address bits and the vector size for vector lcad and store instructions; and provide support for dispatching memory access requests for the SIMD execution unit to memory.

Level-two cache (L2 cache) 192 may be used to store data and instructions for all execution units, including SIMD execution unit 156. An example of an implementation of L2 cache 192 is found in the system sold under the trademark "IBM RISC System/6000 Model 59H" by IBM Corporation. L2 cache 192 is coupled to CPU 188 via data bus 194. L2 cache 192 is also coupled to control unit 180 within SIMD execution unit 156 via data bus 196. Cache controller 198 provides address signals to L2 cache 192. An example of an implementation of cache controller 198 is found in the system sold under the trademark "IBM RISC System/6000 Model 59H" by IBM Corporation. The address utilized to produce such address signals may be computed by load/store execution unit 150 (see FIG. 2).

Figure 4:
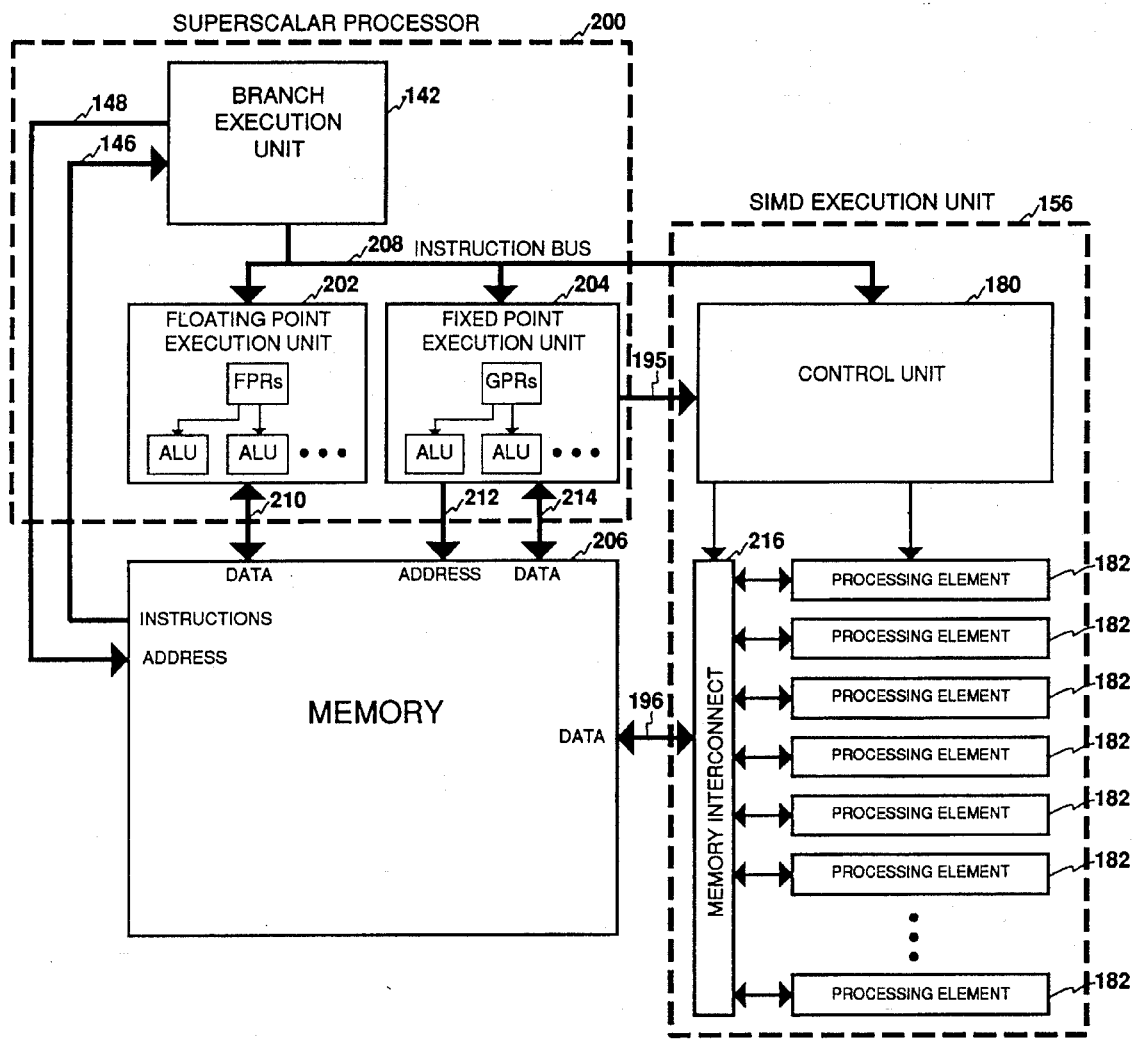
FIG. 4 depicts a more detailed block diagram of the interface between a superscalar processor, a memory, and an SIMD execution unit in accordance with the method and system of the present invention.

With reference now to FIG. 4, there is depicted a more detailed block diagram of the interface between a superscalar processor, a memory, and an SIMD execution unit in accordance with the method and system of the present invention. As illustrated, superscalar processor 200 includes branch execution unit 142, floating-point execution unit 202, and fixed-point execution unit 204. Branch execution unit 142 provides address signals to memory 206 via address bus 148, and receives instructions from memory 206 via instruction bus 146. Such instructions are then dispatched to selected execution units, including floating-point execution unit 202, fixed-point execution unit 204, and SIMD execution unit 156, via instruction bus 208. Branch execution unit 142 dispatches instructions to an execution unit that is designed to perform the type of operation represented by the instruction. For example, an instruction representing a floating-point arithmetic operation is dispatched by branch execution unit 142 to floating-point execution unit 202.

Floating-point execution unit 202 may include a plurality of arithmetic logic units (ALUs) coupled to a group of "floating-point registers" (FPRs). Floating-point execution unit 202 is coupled to memory 206 via data bus 210. Similarly, fixed-point execution unit 204 may include a plurality of arithmetic logic units coupled to a group of "general purpose registers" (GPRs). Fixed-point execution unit 204 may be coupled to memory 206 via address bus 212 and data bus 214.

Within SIMD execution unit 156, control unit 180 controls a plurality of processing elements 182 and memory interconnect 216. In a preferred embodiment, control unit 180 may include three main functional units; (1) an instruction control unit; (2) a load data unit; and (3) a store data unit. The instruction control unit may be further divided into (a) an instruction assembly unit, (b) an instruction expansion unit, and (c) a command dispatch unit. Other tasks which may be performed in control unit 180 include performance monitoring and error logging.

The instruction assembly subunit within control unit 180 provides the instruction and control interface with superscalar processor 200 by receiving, buffering, and pipelining vector instructions dispatched from branch execution unit 142. Control unit 180 also receives and buffers storage access control information from fixed-point execution unit 204 transmitted on interface bus 195. Such storage access control information may include addresses calculated by fixed-point execution unit 204. Control unit 180 holds dispatched instructions and associated control information until branch execution unit 142 commits the instruction to complete, execution. After branch execution unit 142 commits an SIMD execution unit instruction to complete, no previously dispatched instruction can cause the SIMD execution unit instruction to abort.

An instruction queue within matrix control unit 180 stores instructions awaiting execution. If the instruction queue is nearly full, matrix control unit 180 notifies branch execution unit 142 that the SIMD execution unit 156 is unable to accept additional instructions. Instructions are released from the instruction queue for execution after receiving a completion signal from branch execution unit 142 which commits the instruction to complete. Branch execution unit 142 commits an instruction to complete after evaluating data, address, and control flow hazards that may occur because of out-of-order execution of instructions in other execution units.

The instruction expansion unit within the instruction control unit translates SIMD execution unit instructions into commands that may be dispatched to selected processing elements 182 and executed simultaneously within such processing elements 182 to carry out the SIMD execution unit instruction dispatched from branch execution unit 142. When the instruction expansion subunit dispatches commands to several processing elements 182, such processing elements may be coordinated to provide portions of a vector calculated in a vector operation. For example, if a vector contains sixteen elements, eight processing elements 182 may be utilized to execute the two SIMD operations that are required to implement the full 16-element vector operation. Each SIMD operation produces an eight-element result, where one element of the result is produced on each of the eight processing elements 182.

The command dispatch unit within the instruction control unit dispatches subsection commands (which includes processing element commands) as dispatch conditions are met. The command dispatch logic enables out-of-order execution of matrix processing element commands generated by the instruction expansion unit. Such out-of-order execution allows parallel execution of loads or stores with arithmetic operations.

The load data unit within control unit 180 is capable of loading one to eight 32-bit or 64-bit elements (i.e., individual values in a vector) from any word-aligned address in memory to any single processing element 182, where such elements will be stored into consecutive registers in the processing element. The register structure in processing elements 182 are discussed in greater detail with reference to FIG. 5. The load data unit may also support other types of load operations including loading a single 32-bit or 64-bit element and routing individual bits to a processing element.

When SIMD execution unit 156 sends a request for data to memory 206, the data requested may not be sent from memory 206 to SIMD execution unit 156 in the order the data was requested. For example, if requested data resides in L2 cache memory (included in the hierarchical structure of memory 206), memory 206 may respond by sending data to SIMD execution unit 156 within a short period of time. However, if requested data is not located in the relatively fast L2 cache memory, such requested data may be retrieved from a memory location having a relatively high latency compared with the latency of L2 cache. This means that memory 206 is able to send some data to SIMD execution unit 156 sooner than other data. While SIMD execution unit 156 is waiting for data from a slower memory, other subsequently requested data may be sent by memory 206 to SIMD execution unit 156 before earlier requested data is sent. To keep track of what data is received as a result of a particular memory request, memory requests from SIMD execution unit 156 are assigned an identifier which is then reassigned to the requested data from memory 206 and transferred with the data to SIMD execution unit 156.

The store data unit within matrix control unit 180 provides the ability to store data from matrix processing elements 182 to memory 206. The store data unit also provides the ability to store an entire row or column of data residing in a plurality of matrix processing elements 182.

Figure 5:
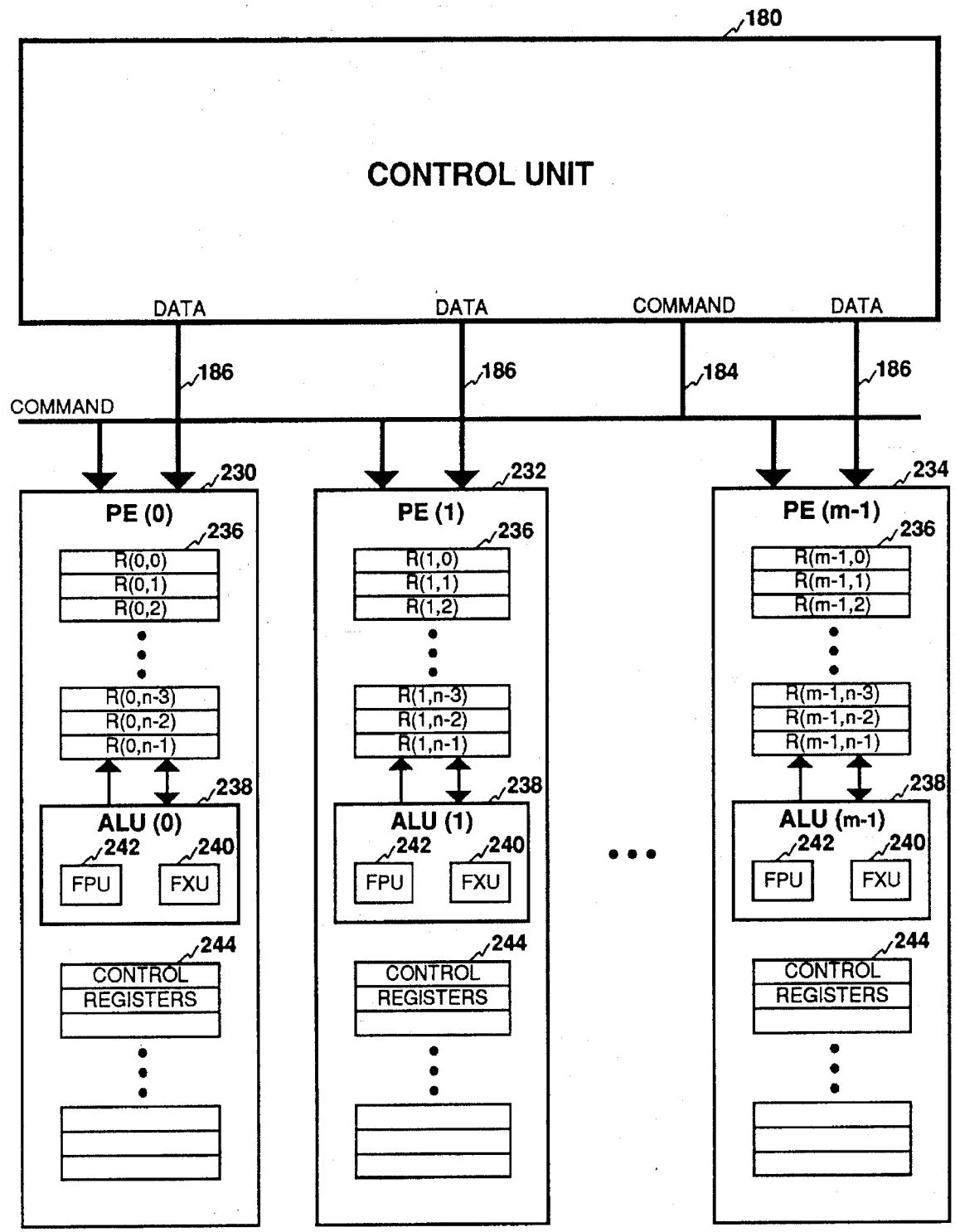
FIG. 5 is a more detailed representation of a processing element in accordance with the method and system of the present invention.

With reference now to FIG. 5, there is depicted a more detailed representation of a processing element in accordance with the method and system of the present invention. As illustrated, a plurality of processing elements 230–234 are coupled to control unit 180 via a common command bus 184 and a plurality of individual data buses 186.

In one embodiment of the present invention, processing elements 230–234 include a register file 236 which may include 512 64-bit registers. Such a register file may include six ports allowing load or store operation to proceed in parallel with an arithmetic operation. The register file stores operands and results for vector operations performed by the processing element.

Each processing element 230–234 may also include an arithmetic logic unit 238. Such an arithmetic logic unit may include both a fixed-point execution unit 240 and a floating-point execution unit 242. Preferably both fixed-point execution unit 240 and floating-point execution unit 242 have a design similar to fixed-point execution unit 204 and floating-point execution unit 202 in superscalar processor 200 (see FIG. 4). By using a similar design, the expense of designing and testing new fixed-point and floatingpoint execution units may be saved.

Also included within processing elements 230–234 are control registers 244. Some control registers 244 may contain status information reflecting the condition of similar registers in control unit 180. Other control registers 244 may be used during operations that require indirect addressing of registers in register file 236.

Memory interconnect 216 in FIG. 4 provides the ability to access a large area of memory in response to executing a single instruction. Memory interconnect 216 in FIG. 4 may also perform a number of data handling and routing functions that route data to one or more processing elements 182 in FIG. 4.

Figure 6:
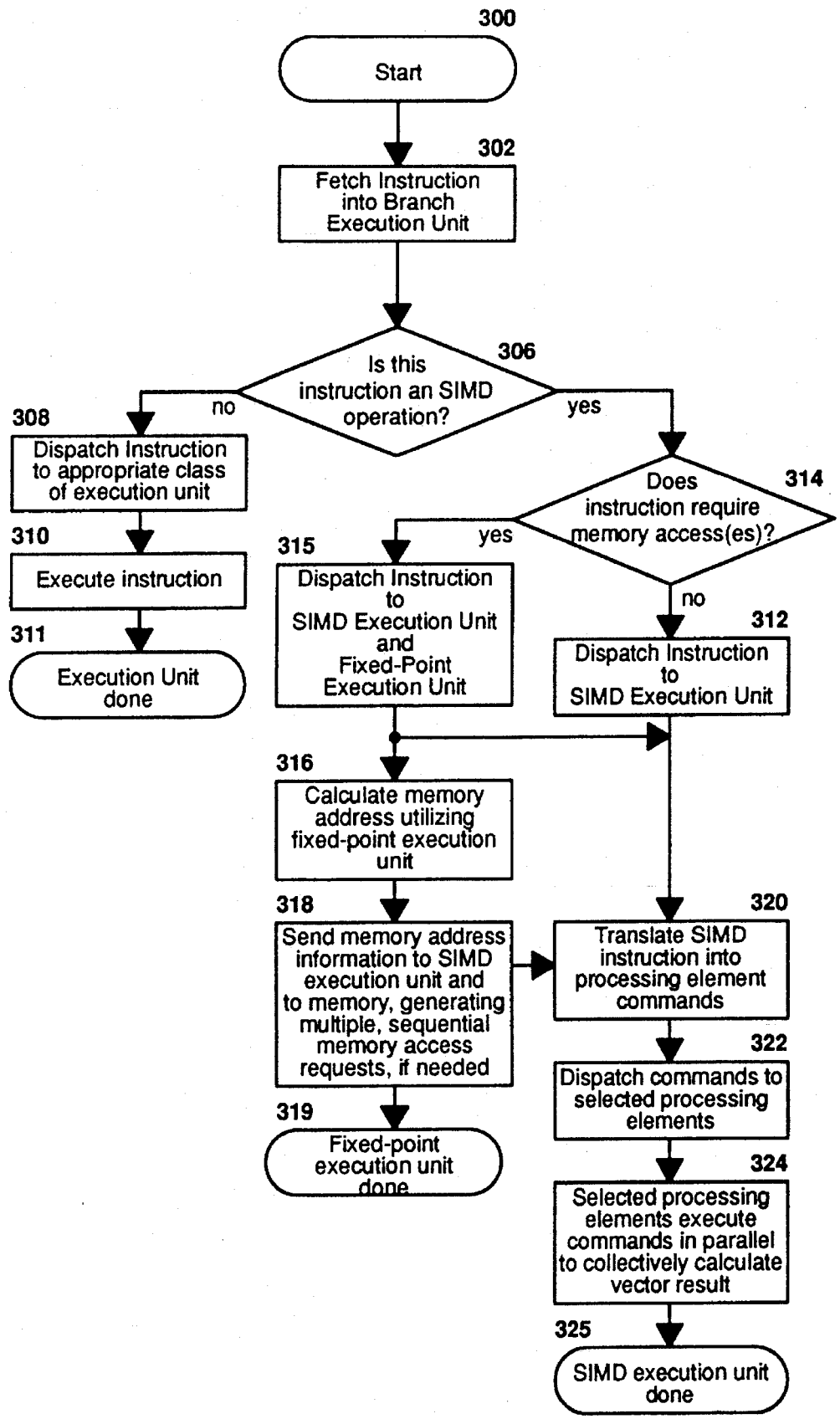
FIG. 6 depicts a high-level logic flowchart representing the process of performing vector operations in an SIMD execution unit in accordance with the method and system of the present invention.

Referring now to FIG. 6, there is depicted a high-level logic flowchart which represents the process of performing vector operations in an SIMD execution unit in accordance with the method and system of the present invention. As illustrated, the process begins at block 300 and thereafter passes to block 302. Block 302 illustrates the process of fetching an instruction into branch execution unit 142 within superscalar processor 200 (see FIG. 4). Branch execution unit 142 may fetch several instructions in a single clock cycle from memory 206 in FIG. 4. Such instructions may belong to one of several classes of instructions, as distinguished by which class of execution unit executes the particular instruction.

Next, the process determines whether or not the instruction represents an SIMD operation, as illustrated at block 306. An operation may be considered an SIMD operation if a single instruction is utilized to cause an operation to be performed on multiple data elements. Such operations include load/store operations to and from SIMD execution unit 156 in FIG. 4, arithmetic operations involving vectors, and logical operations involving vectors. If the instruction does not represent an SIMD operation, the process passes to block 308.

Instructions which are not SIMD operations are then dispatched to an appropriate class of execution unit, as depicted at block 308. For example, branch execution unit 142 will dispatch floating-point arithmetic instructions to floating-point execution unit 202. Thereafter, such dispatched instructions are executed within the appropriate execution unit, as illustrated at block 310. The process of instruction fetching and execution continues, as illustrated at block 302.

Referring again to block 306, if the instruction represents an SIMD operation, the process then determines whether or not the instruction requires access to memory, as illustrated at block 314. An example of an instruction that requires access to memory is an instruction that directs SIMD execution unit 156 to load a vector from memory 206 into selected processing elements 182. SIMD instructions requiring access to memory are then dispatched to both the fixed-point execution unit 204 and SIMD execution unit 156, as depicted at block 315 in FIG. 6. SIMD instructions not requiring access to memory are dispatched only to SIMD execution unit 156, as depicted at block 315.

If the instruction requires access to memory, a memory address is then calculated utilizing fixed-point execution unit 204, as depicted at block 316. Thereafter, the calculated memory address information is sent to SIMD execution unit 156 and to memory 206, as illustrated at block 318.

After any necessary memory addresses have been calculated, the control unit 180 translates the vector operation instruction into commands which may be executed by selected processing elements 182, as depicted at block 320. As illustrated at block 322, such commands are then dispatched to selected processing elements 182 according to the availability and the number of processing elements required to perform the operation. Such commands may also be dispatched out of order.

Once the processing element commands have been dispatched to selected processing elements, such processing elements execute the commands in parallel to collectively calculate a vector result, as depicted at block 324. At this point, a load/store command, which transfers a vector, may also be considered a calculation of a vector result. The process of fetching and executing instructions then continues at block 302 as the process is iteratively repeated.

It should be understood that the process of fetching and executing instructions described above may be one of several similar processes being executed concurrently within the superscalar data processing system 140. Thus, branch execution unit 142 begins to fetch another instruction without waiting for the steps represented by the other blocks in FIG. 6 to be completed.

Figure 7:
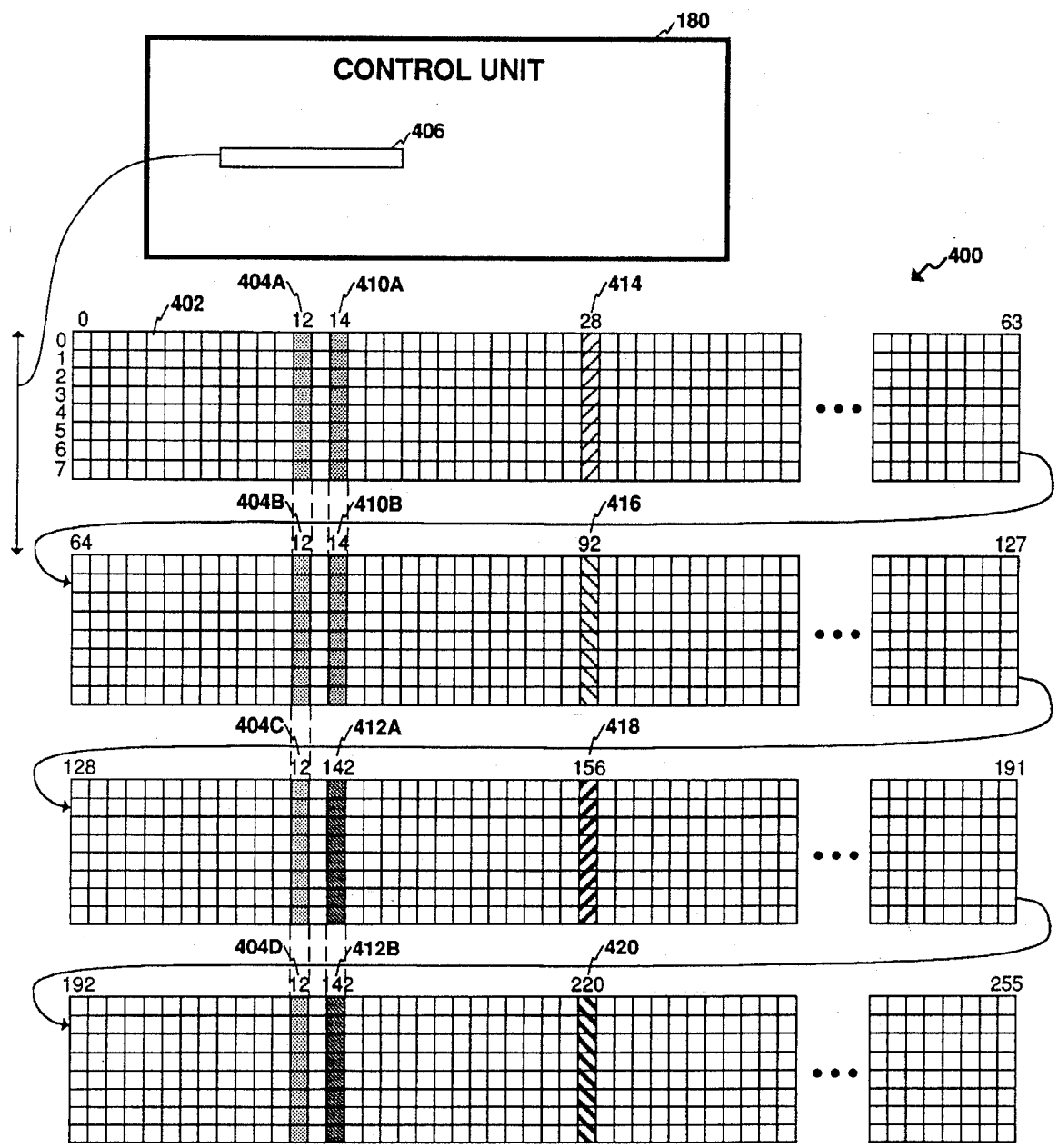
FIG. 7 is an illustration of one configuration of the register matrix in accordance with the method and system of the present invention.

With reference now to FIG. 7, there is depicted register 400 which is comprised of all register files 236 in processing elements 230–234 (see FIG. 5). Register 400 is coupled to control unit 180 as described previously with reference to FIG. 5.

As depicted in FIG. 7, each square, represents a register, such as register 402, which is capable of storing data which represents an element in a vector. In one embodiment, register 402 may be capable of storing a 64-bit value. Register 400 includes 8 rows (0–7) and 256 columns (0–255). Each row of registers may be implemented by a register file 236 within a processing element such as processing elements 230–234 (see FIG. 5). Each column of registers includes one register from each processing element 230–234 where the registers in the column have the same address in the processing elements.

Although the example of FIG. 7 has been depicted with 8 rows and 256 columns, other embodiments may include additional rows by utilizing greater or less than eight matrix processing elements, or other embodiments may include greater or less than 256 columns by selecting processing elements having register files 236 which include more than 256 registers.

As depicted in FIG. 7, a row of 256 registers has been illustrated in four groups: the first group represents registers 0–63, the second group represents registers 64–127, the third group represents registers 128–191, and the fourth group represents registers 192–255. The fact that all rows include 255 registers is illustrated by the curved arrows connecting one group to another.

Vector register 404 illustrates how a vector register having 32 elements may be created in register 400. Vector register 404 is comprised of four columns 404A–404D and may be addressed by the number 12 because the first register of the 32-element vector register is located in the twelfth register of row 0. In order to store an entire 32-element vector in register 400 elements 0–7 are stored in register 12 404A of each processing element, elements 8–15 are stored in register 76 404B of each processing element, elements 16–23 are stored in register 140 404C of each processing element, and elements 24–31 are stored in register 204 404D of each processing element. Thus, a 32-element vector is stored in four separate columns of registers where the registers in a column have the same register number in each of the eight rows. That is, portions of such a 32-element vector are stored in four places in each row wherein each row corresponds to a register file 236 in a processing element 230–234 (see FIG. 5).

Since each processing element which represents a row within register 400 includes an arithmetic logic unit (i.e., arithmetic logic unit 238), and the arithmetic logic unit performs one floating-point or one fixed-point calculation in a cycle, to perform a calculation with vector register 404 four arithmetic operations are needed within each processing element 230–234. Each of these four operations is performed on a register within one of the four columns of vector register 404 (i.e., columns 404A, 404B, 404C, and 404D).

Because each processing element 230–234 includes an arithmetic logic unit for performing operations utilizing registers in a single row, (i.e., a single register file 236), multiple operations on multiple vector elements may be performed in a single cycle. In this embodiment, where eight processing elements 230–234 are utilized, eight calculations may be performed on eight vector elements in a single cycle. Therefore, all calculations involving the 32 elements in vector register 404 may be accomplished in four cycles.

As previously described with reference to FIG. 4, control unit 180 includes an instruction expansion unit which translates each SIMD execution unit instruction into a sequence of commands which are then dispatched to selected processing elements. To properly translate SIMD execution unit instructions into such sequences of commands, matrix control unit 180 utilizes control information stored in a plurality of control registers, such as control registers 406. In FIG. 7, the vector register stride parameter is stored in control register 406.

The vector register stride parameter specifies the number of registers between columns that comprise a vector register. The vector register stride specifies a number of configuration characteristics. The vector register stride directly specifies the distance between columns that comprise a vector register that is larger than the number of processing elements. The vector register stride can also be interpreted as specifying the maximum number of available vector registers. The vector register stride also indirectly specifies several other vector/scalar register configuration characteristics. The number of columns comprising a vector register is equal to the number of columns of the register matrix divided by the vector register stride. The number of columns comprising a vector register is also the maximum number of scalar registers that can be employed in place of a single vector register. The vector register stride also indirectly specifies the maximum vector size supported by that setting. This maximum vector size is equal to the product of the number of processing elements and the number of columns comprising a vector register, being the quotient involving the vector register stride.

In the configuration shown in FIG. 7, the stride, which is indicated by the double ended arrow near column 0, is 64. This means that if a vector register having a length of 32 elements begins at column 12, elements 0–7 will be stored in column 12 (i.e., register 12 of each of the register files in the processing elements), and that elements 8–15 will be stored in column 76, which is 64 columns away from column 12. Similarly, elements 16–23 will be stored in column 140 and elements 24–31 will be stored in column 204. Thus, in order to store a vector having more elements than the number of registers in a column (i.e., the number of processing elements), the vector must be stored in multiple columns where the columns have a length equal to the number of processing elements, and where the segments are evenly spaced a number of columns or addresses apart as specified by the value of the vector register stride parameter stored in control register 406. From the perspective of a data processing system user, vector elements 0–31 may be addressed by referencing column 12 in an SIMD execution unit instruction.

Those persons skilled in the art should appreciate that the selection of a vector register stride parameter may determine the maximum length of a vector register and the number of columns segment that comprise a vector register. By specifying vector register stride, the number of available vector and scalar registers and the maximum vector size are also specified. This mechanism allows trading off a number of vector registers with vector size. The same number of scalar registers is always available, as any column of the register matrix can be employed as a scalar register. However, scalar registers come at the expense of vector registers. If a very large number of scalar registers is required, the vector size may need to be reduced to provide a sufficient number of vector registers. If a very large number of scalar registers is required, but few vector registers are needed, a large vector size can be supported.

A data processing system user may perform operations on vectors having different vector lengths without wasting register storage space because shorter vectors are stored in longer vector registers. In the example illustrated in FIG. 7, vector register 14 may contain one operand for a vector operation while vector register 142 may contain a second operand to be utilized in the same vector operation. That is, a vector operation may be performed wherein vector register 14 is added to vector register 142.

A scalar value may also be stored in register matrix 400. Examples of scalars stored within register matrix 400 include scalars 414, 416, 418, and 420. Although a scalar operand represents a single value rather than an array of values, in a preferred embodiment, a scalar operand is stored in the same register in each register file within each matrix processing element. As shown in FIG. 7, a 32-element column (i.e., a group of registers which may be used to store a 32-element vector) within register 400 may be used to store four scalar values 414–420 where the first scalar value is stored in register 28 of each processing element, the second scalar value is stored in register 92 of each processing element, the third scalar value is stored in register 156 of each processing element, and the fourth scalar value is stored in register 220 of each processing element. Thus, according to an important aspect of the present invention, the same registers which may be concatenated to form a 32-element vector register may also be used to store one or more scalar values.

To distinguish between vector operands and scalar operands within register 400 control unit 180 receives instructions from branch execution unit 142 (see FIG. 4) that distinguish vector operands from scalar operands. One way to distinguish vector and scalar expressions is to use different instruction operands for each combination of operands in an operation (e.g., vector+vector, vector+scalar, scalar+scalar . . . ). In response to receiving a particular instruction, and in response to parameters stored in control registers 244, the instruction expansion unit, and the command dispatch unit, dispatch appropriate commands to each processing element such that vector and scalar data stored in register 400 are handled appropriately. For example, if vector 404 (i.e., columns 404A–D) is to be multiplied by scalar 414, the instruction expansion unit issues commands to all processing elements which cause the arithmetic logic units to perform four multiplication operations on the four-column vector 404 and single-column scalar 414.

Figure 8:
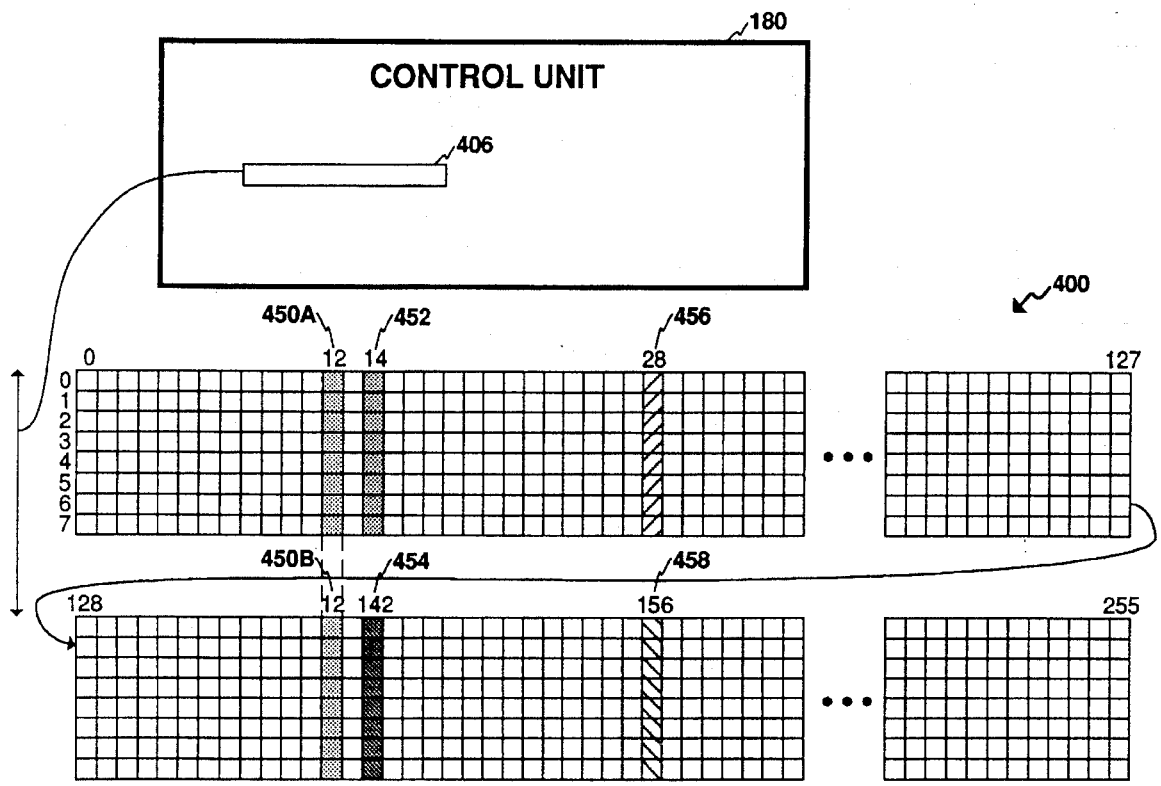
FIG. 8 depicts another configuration of the register matrix in accordance with the method and system of the present invention.

With reference now to FIG. 8, there is depicted another configuration of register 400 where the stride parameter in register 406 has been set to 128, implying a vector size of 16. As may be seen in this example, register 12 is a vector register containing 16 elements where elements 0–7 are stored in register 12 of each processing element and elements 8–15 are stored in register 140 of each processing element. If the vector section size in register 408 were set to 8, the column of 16 registers would be able to store two 8-element vectors, as illustrated at 452 and 454 where 8-element vector 452 is stored in register 14 of each processing element and 8-element vector 454 is stored in register 142 of each processing element.

Also shown in FIG. 8 are two scalar values stored in register 28 and register 156, respectively, of each matrix processing element. Here again, FIG. 8 illustrates how vectors of two different sizes may be stored in register matrix 400 without sacrificing registers because a shorter vector is stored in a longer vector register. According to an important aspect of the present invention, a data processing system user may dynamically change the configuration of register matrix 400 from the configuration illustrated in FIG. 7 to the configuration illustrated in FIG. 8 by storing new parameters, such as the vector register stride parameter and the vector section size parameter, in control registers 244 in control unit 180. Therefore, data stored in the registers of register 400 are grouped into various vector registers of different lengths, and into scalar registers, depending upon the parameters stored in control registers 244 and the SIMD execution unit instructions received by control unit 180 from branch execution unit 142. This means that a single register 402 within register matrix 400 is not permanently designated to be part of a vector register or a scalar register. This also means that the configuration of register matrix 400 with respect to what registers are designated to constitute a scalar register, or a vector register of a particular length, must be evaluated on a cycle-by-cycle basis with reference to the parameters stored in control register 406 and the instructions received from branch execution unit 142.

Figure 9:
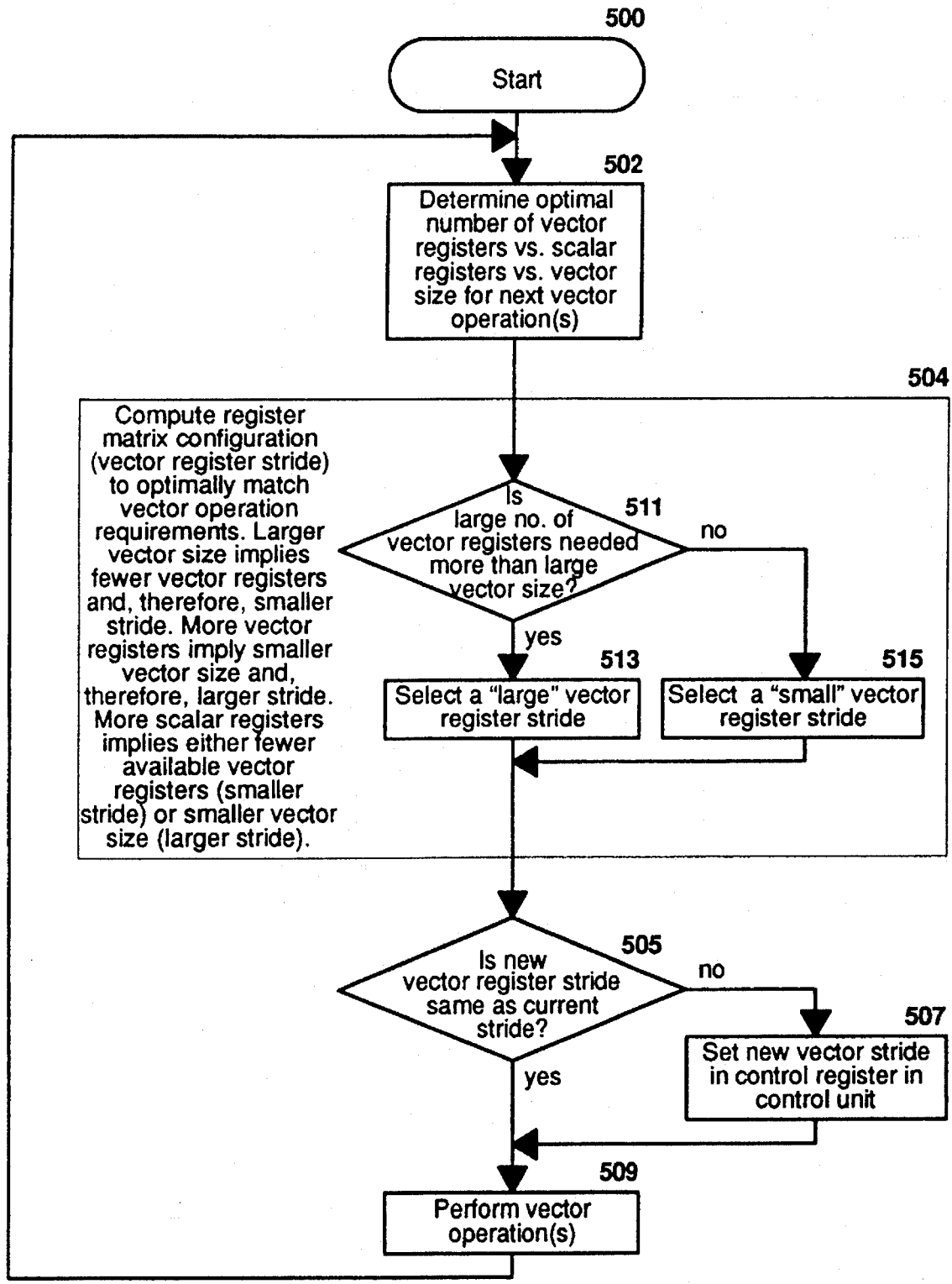
FIG. 9 is a high-level flowchart of the process of dynamically reconfiguring a register matrix in an SIMD execution unit in accordance with the method and system of the present invention.

Referring now to FIG. 9, there is depicted a high-level flowchart of the process of dynamically reconfiguring a register matrix in an SIMD execution unit in accordance with the method and system of the present invention. As illustrated, the process begins at block 500 and thereafter passes to block 502. As illustrated at block 502, the process first determines a maximum vector length that is needed for an upcoming vector calculation. This step may be accomplished by examining the vector expressions that will be used in a vector calculation and counting the number of elements comprising such a vector expression. Many times it is advantageous to have a vector register which permits the vector instruction to operate on an entire vector with a single vector operation. The process next determines the number of vector registers and scalar registers that will be required. Some analysis must also be performed to prioritize vector length versus number of vector registers and scalar registers. Some cases may benefit by a large vector length and little my a massive number of vector and scalar registers. Still, other cases may benefit from a larger number of vector registers with few scalar registers. Yet still, other cases may benefit most from a massive number of scalar registers with just a few vector registers. The process at block 502 must perform this analysis.

Next, the process selects a vector register stride parameter in response to the determination of the optimal vector length, the optimal number of vector registers, and the optimal number of scalar registers, as depicted at block 504. Such a vector register stride parameter may also be referred to as an "offset." For example, if it has been determined that a vector register having a length of 32-elements is required, the vector register stride parameter may be set to 64 such that four columns of eight registers may be utilized to store the 32-element vector. A vector register stride of 64 also specifies a maximum of 64 32-element vector registers are supported. In this example, we shall assume that eight vector register processing elements are used and each vector register processing element includes a register file having 256 registers. Thus, with a vector register stride parameter equal to 64, the 256-register register file may be divided into four sections (256÷64=4) since, in this example, there are eight register files, four columns of 8-registers may be concatenated to form a register vector having 32-elements.

Box 511 of the process asks the question of whether the vector operation benefits most from a larger number of registers or from a large vector length, as determined in box 502. If more vector registers are optimum, box 513 suggests selecting a larger vector register stride. If a larger vector length is optimum, box 515 suggests selecting a smaller vector register stride.

Once the vector register stride parameter has been selected, if the selected stride is different from the current setting in control register 406, as asked by box 505 of the process, the vector register stride parameter is stored in the appropriate control register in vector register control unit 180, as illustrated at block 507. This step may be done by writing the vector register stride parameter to register 406 (see FIGS. 7 & 8).

Thereafter, as depicted at block 509, the process performs the vector operation or series of operations as directed by SIMD execution unit instructions received from branch execution unit 142. As discussed above, in performing an SIMD execution unit instruction, the instruction expansion unit within control unit 180 sends the necessary commands to processing elements 230–234. When receiving commands fromm control unit 180, processing elements 230–234 pipeline such commands and execute such commands in parallel.

During the course of executing an application, a different register matrix configuration may become more optimal. If such a situation arises, the process is repeated, performing the analysis to determine the optimal section size and number of vector and scalar registers.

While the invention has been particularly shown and described with reference to a preferred embodiment, it will be understood by those skilled in the art that various changes in form and detail may be made therein without departing from the spirit and scope of the invention.

What is claimed is:

1. A single-instruction, multiple-data processor having a register file that may be dynamically reconfigured, said single-instruction, multiple-data processor comprising:

a controller;

a plurality of registers coupled to said controller and arranged in an array having a configuration of N rows of M columns of said registers, where N and M are integers;

means for storing a vector size, VS, within said controller, wherein said vector size specifies a number of said plurality of registers comprising a vector register, where VS is an integer less than M multiplied by N;

means, responsive to said vector size, for selecting selected ones of said M columns to form said vector register having at least VS registers; and means for performing a vector operation utilizing data stored in said vector register.

2. A single-instruction, multiple-data processor having a dynamically reconfigurable register file according to claim 1 wherein said means for performing a vector operation utilizing data stored in said vector register comprises N arithmetic logic units, where one of said N arithmetic logic units is coupled to each of said N rows of M columns of said registers.

3. A single-instruction, multiple-data processor having a dynamically reconfigurable register file according to claim 1 wherein said M columns of said registers are addressed consecutively, and wherein said means for selecting selected ones of said M columns to form said vector register having at least VS registers comprises:

means for storing a stride parameter, STR, within said controller, wherein said stride parameter specifies a number of said consecutive addresses of said M columns between said selected ones of said M columns that comprise said vector register, where STR is an integer less than or equal to M.

4. A single-instruction, multiple-data processor having a dynamically reconfigurable register file according to claim 1 further including:

means, within said controller, for forming a scalar register from a selected column of said M columns of said registers, wherein said scalar register may be utilized for storing a scalar expression; and means for performing arithmetic operations utilizing expressions stored in said scalar register and said vector register in said array.

5. A method in a single-instruction, multiple-data processor for dynamically reconfiguring a register file where said single-instruction, multipledata processor includes an array of registers arranged in N rows of M columns, where N and M are integers, said method comprising the steps of:

selecting a vector size, VS, where VS is an integer less than or equal to N multiplied by M;

in response to the value of said selected vector size, selecting X number of columns from said M columns of registers in said array of registers; and concatenating registers in said X number of selected columns to form a vector register having at least VS number of registers, wherein said vector register size may be dynamically selected.

6. The method in a single-instruction, multiple-data processor for dynamically reconfiguring a register file according to claim 5 wherein said M columns in said array of registers are addressed by consecutive numbers and wherein said step of selecting X number of columns from said M columns of registers in said array of registers includes the steps of:

selecting a stride, STR, where STR is an integer;

selecting said X number of columns wherein said addresses of said X number of columns are evenly spaced apart by STR number of addresses.

7. The method in a single-instruction, multiple-data processor for dynamically reconfiguring a register file according to claim 5 further including the steps of:

selecting a column from said M columns of said registers for forming a scalar register, wherein said scalar register may be utilized for storing a scalar expression for performing an arithmetic operation utilizing expressions stored in said scalar register and said vector register in said array.

* * * * *

UNITED STATES PATENT AND TRADEMARK OFFICE
CERTIFICATE OF CORRECTION

PATENT NO.    : 5,513,366
DATED         : April 30, 1996
INVENTOR(S)   : Agarwal et al.

It is certified that error appears in the above-indentified patent and that said Letters Patent is hereby corrected as shown below:

Column 6, line 31: change "lcad" to --load--

Column 8, line 60: change "floatingpoint" to --floating-point--

Column 15, line 28: change "multipledata" to --multiple-data--

Signed and Sealed this

Thirteenth Day of August, 1996

*Attest:*

BRUCE LEHMAN

*Attesting Officer*    *Commissioner of Patents and Trademarks*